United States Patent
Hedayat et al.

(10) Patent No.: US 9,686,688 B2
(45) Date of Patent: Jun. 20, 2017

(54) FREQUENCY CHANNEL SELECTION BY AN LTE-U WIRELESS ACCESS POINT OPERATING IN THE PRESENCE OF OTHER LTE-U AND WI-FI ACCESS POINTS

(71) Applicant: Cisco Technology, Inc., San Jose, CA (US)

(72) Inventors: Ahmadreza Hedayat, Allen, TX (US); Rajesh Pazhyannur, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 335 days.

(21) Appl. No.: 14/494,948

(22) Filed: Sep. 24, 2014

(65) Prior Publication Data

US 2016/0088631 A1 Mar. 24, 2016

(51) Int. Cl.

| | |
|---|---|
| *H04W 48/00* | (2009.01) |
| *H04W 16/14* | (2009.01) |
| *H04B 7/06* | (2006.01) |
| *H04B 17/309* | (2015.01) |
| *H04W 36/00* | (2009.01) |
| *H04W 84/12* | (2009.01) |

(52) U.S. Cl.
CPC ............ *H04W 16/14* (2013.01); *H04B 7/063* (2013.01); *H04B 17/309* (2015.01); *H04W 48/00* (2013.01); *H04W 36/0077* (2013.01); *H04W 84/12* (2013.01)

(58) Field of Classification Search
CPC .... H04B 1/7097; H04B 7/0857; H04B 7/063; H04B 17/309; H04J 11/0023; H04W 52/244; H04W 36/0077; H04W 48/00
See application file for complete search history.

(56) References Cited

U.S. PATENT DOCUMENTS

| | | | |
|---|---|---|---|
| 2014/0018122 A1* | 1/2014 | Cahill ................... | H04L 5/0005 455/513 |
| 2015/0117186 A1* | 4/2015 | Uchida ................. | H04W 28/20 370/230 |

(Continued)

OTHER PUBLICATIONS

McKibben, et al., "LTE-Unlicensed: Augmenting Mobile Data Capacity, but Coexistence Needs Consideration," NCTA Technical Paper, retrieved from http://www.nctatechnicalpapers.com/Paper/2014/2014-lte-unlicensed-augmenting-mobile-data-capacity-but-coexistence-needs-consideration/download, on Sep. 24, 2014, 15 pages.

(Continued)

*Primary Examiner* — Andrew Chriss
*Assistant Examiner* — Salvador E Rivas
(74) *Attorney, Agent, or Firm* — Edell, Shapiro & Finnan, LLC

(57) ABSTRACT

A Long-Term Evolution-Unlicensed (LTE-U) access point (AP) is configured to operate wirelessly on any of multiple RF channels in an unlicensed frequency band. The AP detects other LTE-U APs and Wi-Fi APs operating on active ones of the multiple channels. The AP determines AP channel statistics for each detected AP. The AP determines, for each active channel, a per-channel metric based on the AP channel statistics. The AP ranks the active channels according to the corresponding per-channel metrics, and selects a best channel on which to transmit in the unlicensed frequency band from among the ranked active channels based on the rankings.

29 Claims, 5 Drawing Sheets

(56) References Cited

U.S. PATENT DOCUMENTS

| | | | | |
|---|---|---|---|---|
| 2015/0133184 A1* | 5/2015 | Sadek | ................... | H04W 16/14 455/552.1 |
| 2015/0288809 A1* | 10/2015 | Liang | ................... | H04W 16/14 455/419 |
| 2015/0350599 A1* | 12/2015 | Yang | ........................ | H04N 7/15 348/14.02 |
| 2016/0066204 A1* | 3/2016 | Khawer | .............. | H04W 72/085 455/500 |

OTHER PUBLICATIONS

Qualcomm, "Qualcomm Research LTE in Unlicensed Spectrum: Harmonious Coexistence with Wi-Fi," Jun. 2014, retrieved from https://www.qualcomm.com/media/documents/files/lte-unlicensed-coexistence-whitepaper.pdf, on Sep. 24, 2014, 19 pages.

Huawei, "U-LTE: Unlicensed Spectrum Utilization of LTE," retrieved from www.huawei.com/ilink/en/download/HW_327803, on Sep. 24, 2014, 20 pages.

* cited by examiner

US 9,686,688 B2

FREQUENCY CHANNEL SELECTION BY AN LTE-U WIRELESS ACCESS POINT OPERATING IN THE PRESENCE OF OTHER LTE-U AND WI-FI ACCESS POINTS

TECHNICAL FIELD

The present disclosure relates to wireless access points.

BACKGROUND

Long-Term Evolution-Unlicensed (LTE-U) is an adaptation of the LTE standard that operates in unlicensed frequency bands. As currently defined by the $3^{rd}$ Generation Partnership Project (3GPP), LTE-U targets 5 GHz and other unlicensed frequency bands. As a consequence, LTE-U operates in some of the same frequency bands defined for the IEEE 802.11 or "Wi-Fi" standard, e.g., 5 GHz frequency bands. The spectrum overlap between LTE-U and Wi-Fi can present spectrum access and interference problems for Wi-Fi and LTE-U wireless access points concurrently operating within transmission range of each other in a given geographical region. Presently, there is no generally accepted, standardized channel assignment/selection protocol to mitigate interference between the concurrently operating LTE-U and Wi-Fi APs.

DESCRIPTION OF EXAMPLE EMBODIMENTS

Overview

Techniques presented herein enable an access point (AP) to select a "best" radio frequency (RF) frequency channel on which to operate in an unlicensed frequency band occupied by other concurrently operating APs. The AP (also referred to as "a first protocol AP") is configured to operate wirelessly on any of multiple RF channels in the unlicensed frequency band according to a first wireless protocol. The AP detects other first wireless protocol APs operating according to the first wireless protocol and second wireless protocol APs operating according to a second wireless protocol on active ones of the multiple channels. The AP determines AP channel statistics for the detected APs, including a respective received signal strength indication (RSSI) for each detected AP and a respective time utilization indicative of a transmission time of each detected AP on the corresponding active channel. The AP determines, for each active channel, a per-channel metric based on all of the RSSIs and time utilizations for the detected APs operating on that active channel. The AP ranks the active channels according to the corresponding per-channel metrics, and selects a best channel on which to transmit in the unlicensed frequency band from among the ranked active channels based on the rankings. In an embodiment, the first wireless protocol is a Long-Term Evolution-Unlicensed (LTE-U) protocol and the second wireless protocol is a Wi-Fi protocol.

EXAMPLE EMBODIMENTS

Figure 1:
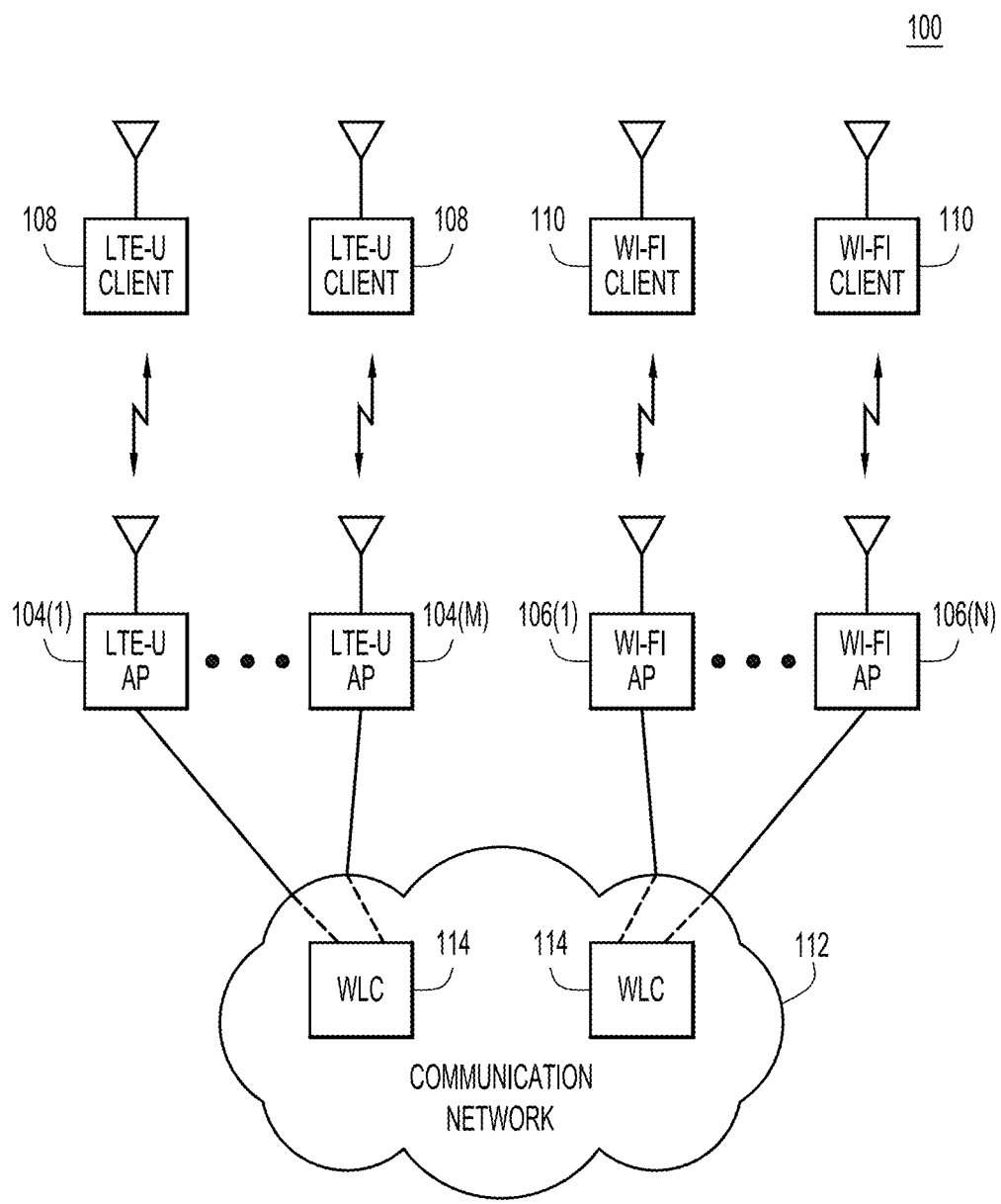
FIG. 1 is a diagram of an example wireless communication network environment in which a wireless access point (AP) implements techniques to select a best radio frequency (RF) channel in an unlicensed frequency band on which to operate, according to an example embodiment.

Referring first to FIG. 1, there is shown a diagram of an example wireless communication network environment 100 in which a wireless access point (AP) selects a best radio frequency (RF) channel among multiple candidate frequency channels on which to operate. The technique to select the best frequency channel is also alternatively referred to as either a "channel assignment" or a "frequency planning" technique. Communication network environment 100 includes wireless access points (APs) 104(1)-104(M) configured to operate in accordance with a first wireless communication protocol/standard (i.e., "wireless protocol"), such as the Long-Term Evolution-Unlicensed (LTE-U) protocol. Environment 100 also includes APs 106(1)-106(N) configured to operate in accordance with a second wireless communication protocol, such as any of the IEEE 802.11 wireless communication protocol (i.e., the "Wi-Fi" protocol).

In the LTE-U and Wi-Fi example, APs 104 are referred to as LTE-U APs (or "eNB" APs by the 3GPP) and APs 106 are referred to as Wi-Fi APs. LTE-U APs 104 communicate wirelessly with (i.e., transmit/receive wireless traffic to/from) LTE-U client devices 108 over radio frequency (RF) channels within a 5 GHz frequency band. Specifically, in a downlink direction, LTE-U APs 104 transmit wireless traffic to LTE-U client devices 108 in an unlicensed portion of the 5 GHz band. In an uplink direction, LTE-U APs 104 receive wireless traffic from LTE-U client devices 108. Similarly, Wi-Fi APs 106 communicate wirelessly with Wi-Fi client devices 110 over RF channels shared by LTE-U APs 104 within the 5 GHz frequency band. Wi-Fi APs 106 may also communicate with Wi-Fi client devices 110 in a 2.4 GHz frequency band.

APs 104 and 106 also communicate with a communication network 112, which may include one or more wide area networks (WANs), such as the Internet, and one or more local area networks (LANs). APs 104 and 106 also communicate with one or more wireless local area network (LAN) controllers (WLCs) 114 in communication network 112 over wired or wireless connections. Each of WLCs 114 may be used to provide network control over one or more of APs 104 and 106 allocated to the WLC.

A given geographical area may be populated with a large number of LTE-U APs 104 and Wi-Fi APs 106 within range of each other such that when the APs operate concurrently on the same channels, for example, in the 5 GHz frequency band, they interfere with each other. For example, a given one of LTE-U APs 104 may receive interfering downlink transmissions from neighboring ones of the other LTE-U APs 104 and Wi-Fi APs 106. Accordingly, techniques presented herein enable the given one of LTE-U APs 106 to select a "best" channel on which to operate, e.g., to transmit in the downlink direction, under such conditions. The "best" channel is the channel with a least amount of interference determined according to predetermined metrics, described below.

Figure 2:
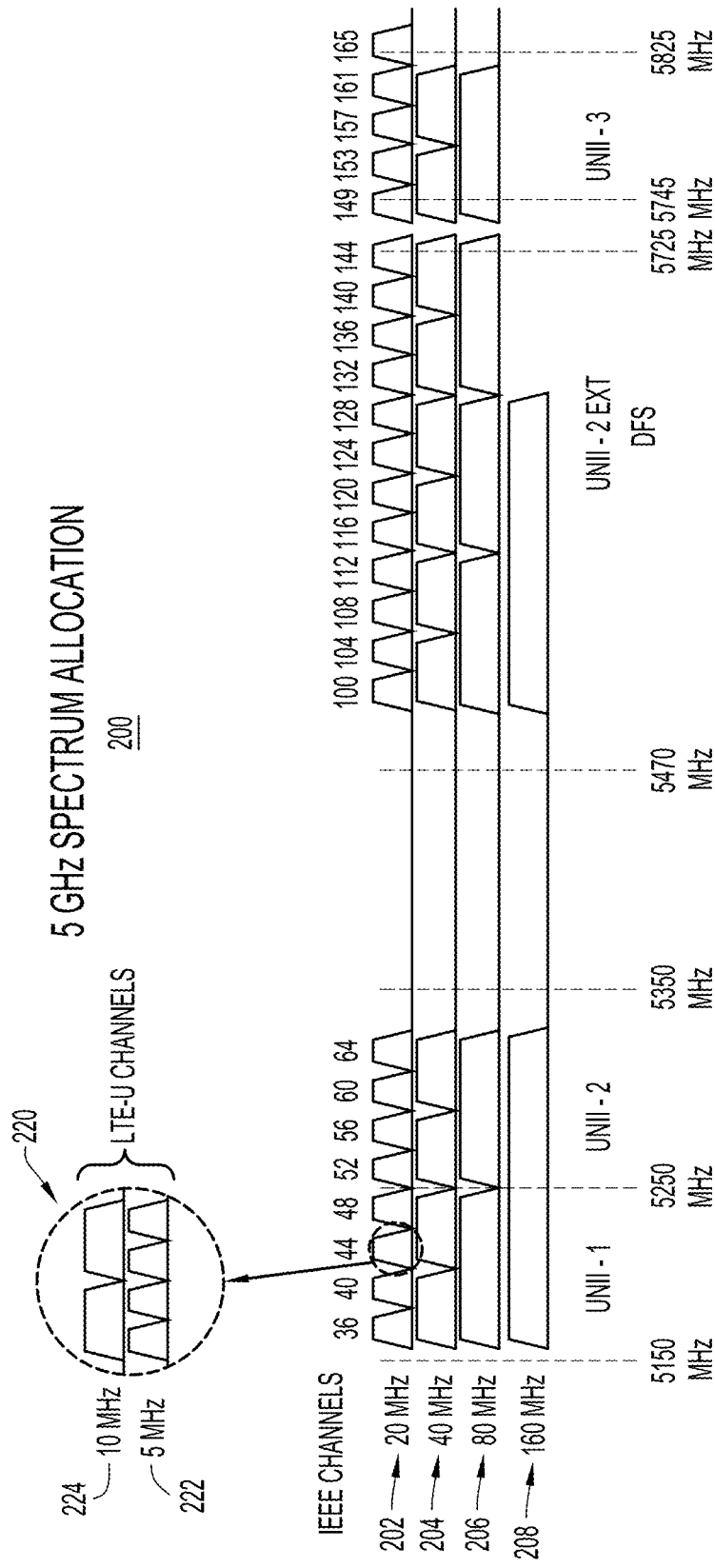
FIG. 2 is an illustration of an example frequency allocation spectrum for a 5 GHz frequency band.

With reference to FIG. 2, there is an illustration of a frequency allocation spectrum 200 for the 5 GHz frequency band mentioned above, including channels in unlicensed portions of the frequency band which may be selected in accordance with techniques presented herein. Spectrum 200 defines individual 20 MHz wireless communication channels 202 sequentially numbered from left-to-right as IEEE channels 36 to 165. Each of channels 202 has a channel bandwidth of 20 MHz. Channels 202 are divided into Unlicensed National Information Infrastructure (UNII) bands UNII-1, UNII-2, UNII-2 Extended (Ext), and UNII-3.

Wi-Fi APs 106 may operate with a channel bandwidth of 20 MHz in individual ones of the 20 MHz channels 202. Also, specifically allowed sets of adjacent pairs of individual 20 MHz channels 36-165 may be joined/combined to form single wideband channels having channel bandwidths greater than 20 MHz in which Wi-Fi APs 106 may operate. For example, adjacent pairs of 20 MHz channels 202 may be joined/combined to form 40 MHz channels 204. Adjacent pairs of individual 40 MHz channels 204 may be joined/combined to form individual 80 MHz channels 206. Similarly, adjacent pairs of individual 80 MHz channels 206 may be joined/combined to form individual 160 MHz channels 208.

The Wi-Fi protocol, e.g., 802.11ac, define a wideband mode for Wi-Fi APs 106 operating in a Basic Service Set (BSS). In the wideband mode, Wi-Fi APs 106 use/operate on a defined pair of adjacent channels, referred to as primary and secondary channels. Each of the primary and secondary channels may be a wideband or joined/combined channel, e.g., a 40 MHz channel or an 80 MHz channel. For example, among 40 MHz channels 204, one of Wi-Fi APs 106 operating in a wideband mode may use a primary channel P (combining 20 MHz channels 36 and 40) and a secondary channel S (combining 20 MHz channels 44 and 48).

LTE-APs 104 may operate on an LTE-U channel having different channel bandwidths supported by the LTE protocol, including channel bandwidths of 1.4 MHz, 3 MHz, 5 MHz, 10 MHz, 15 MHz, and 20 MHz. Thus, each of LTE-U APs 104 may transmit in an LTE-U channel within the unlicensed bands at any of the different LTE bandwidths. In an LTE-U transmit channel example 220 depicted in FIG. 2, one of LTE-U APs 104 transmits on an LTE-U channel that falls within channel 44. LTE-U AP 104 may transmit in any of LTE-U 5 MHz channels 222 or LTE-U 10 MHz channels 224 that fall in channel 44. Edges of LTE-U channels 222 and 224 may or may not be aligned with corresponding edges of channel 44.

Figure 3:
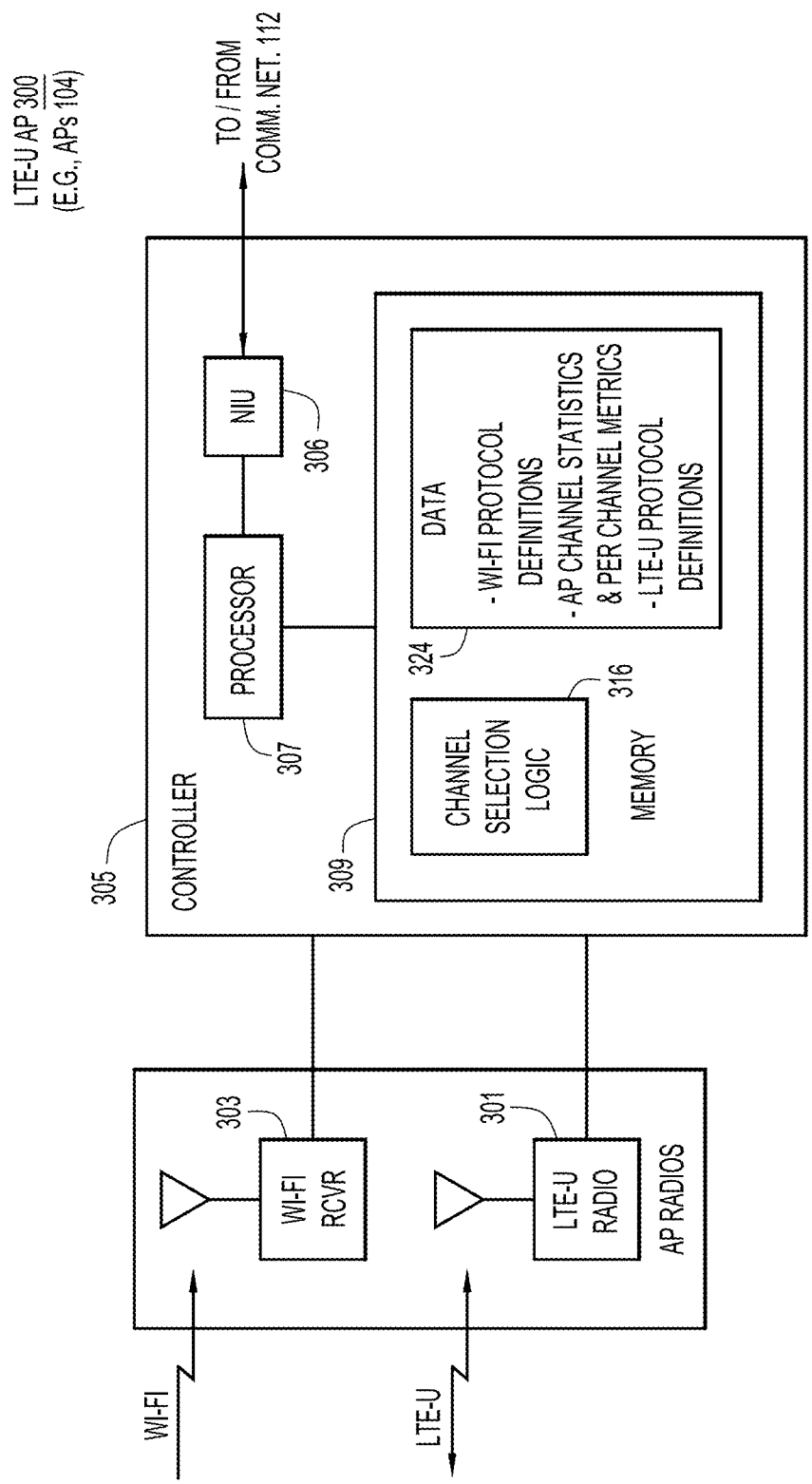
FIG. 3 is a block diagram of an example Long-Term Evolution-Unlicensed (LTE-U) AP configured to operate in accordance with LTE-U wireless protocol/standards and implement channel selection techniques presented herein, according to an example embodiment.

With reference to FIG. 3, there is shown an example block diagram of an LTE-U AP 300, representative of each of LTE-U APs 104 in FIG. 1, configured to select a best radio frequency (RF) channel among multiple candidate frequency channels on which to operate. LTE-U AP 300 includes a wireless LTE-U radio 301 (also referred to as a wireless transmitter/receiver or "transceiver" 301) to support wireless LTE-U communication with LTE-U client devices 108, a wireless Wi-Fi radio 303 to receive Wi-Fi communications from Wi-Fi client devices 110, and an AP controller 305 to which the radios are coupled. Radios 301 and 303 may be integrated into a single radio. LTE-U radio 301 transmits in LTE-U unlicensed frequency bands and Wi-Fi radio 303 receives Wi-Fi transmissions in frequency bands that may overlap the LTE-U unlicensed frequency bands. Each of radios 301 and 303 includes a respective set of one or more antennas.

AP controller 305 may include a wired or wireless network interface unit (NIU) 306, such as an Ethernet interface, that enables the AP to connect to communication network 112 over a wired or a wireless communication link. NIU 306 may also include wireless connection capability.

AP controller 305 also includes a processor 307 and a memory 309. Processor 307 is a microcontroller or microprocessor, for example, configured to execute software instructions stored in memory 309. Memory 309 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 309 may comprise one or more computer readable storage media (e.g., a memory device) encoded with software comprising computer executable instructions and when the software is executed (by processor 307) it is operable to perform the operations described herein.

For example, memory 309 stores or is encoded with instructions for Channel Selection logic 316 to select a best channel among multiple channels on which AP 300 may operate. Memory 309 also stores information/data 324 used by logic 316, including, but not limited to, LTE-U and Wi-Fi protocol definitions (e.g., frame formats), AP channel statistics and per-channel metrics described below.

Figure 4:
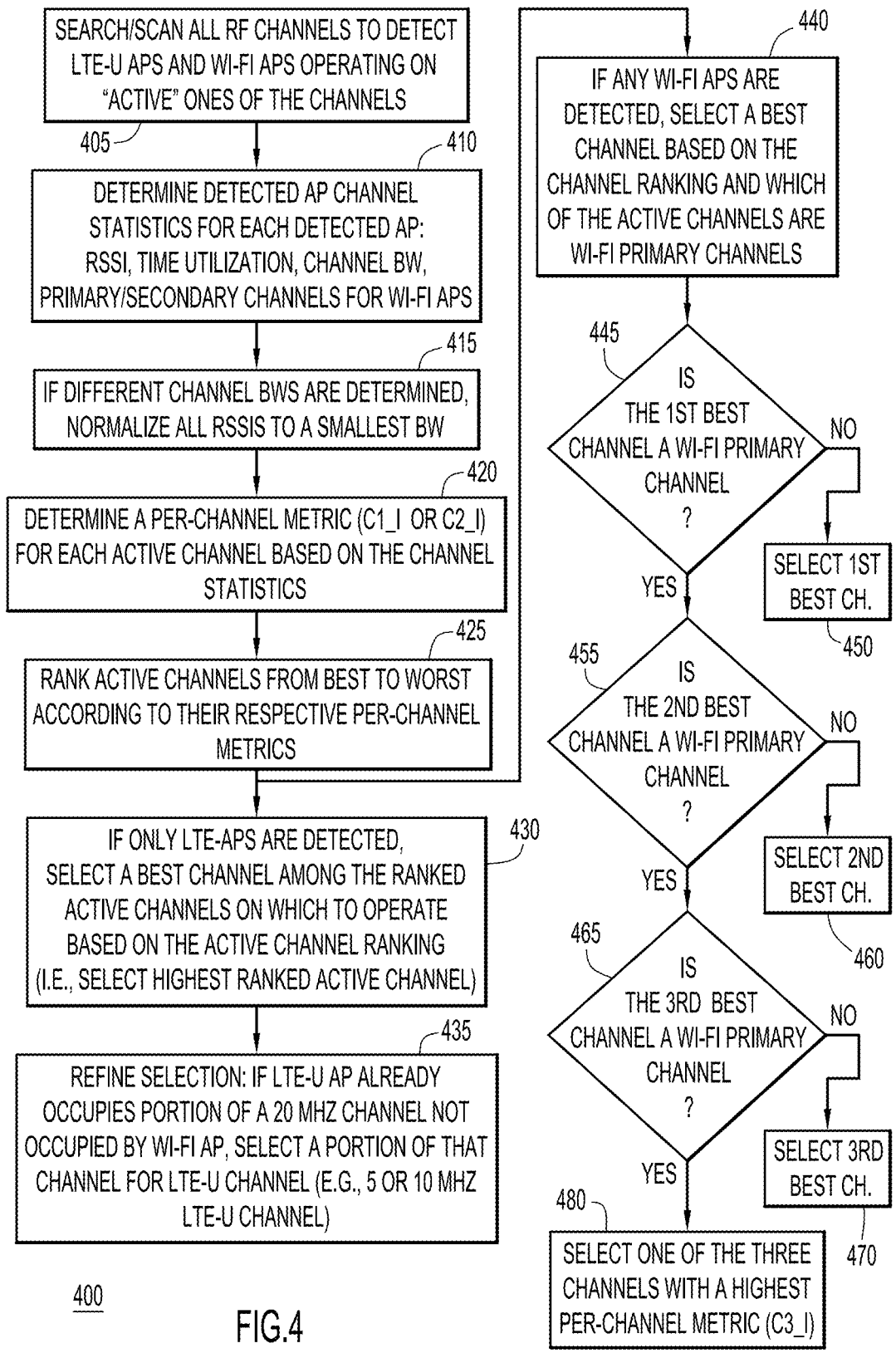
FIG. 4 is a flowchart of an example method of selecting a best channel among multiple candidate frequency channels on which to operate, performed by the LTE-U AP of FIG. 3, according to an example embodiment.

With reference to FIG. 4, there is shown a flowchart of an example method 400 of selecting a best radio frequency (RF) channel among multiple frequency channels on which to operate, performed by AP 300, which is representative of any of LTE-U APs 104 of FIG. 1. Method 400 is performed primarily by controller 305 of AP 300 based on information provided by AP radios 301 and 303.

At 405, AP 300 searches/scans each of multiple channels in a given frequency band to detect other LTE-U APs (other ones of APs 104) and Wi-Fi APs 106 operating on "active" ones of the channels. In other words, AP 300 identifies active channels on which one or more of LTE-U APs 104 and/or Wi-Fi APs 106 are operating. The multiple channels searched/scanned at 405 may include channels within one or more unlicensed frequency bands depicted in FIG. 2, e.g., channels in the UNII-3 frequency band. To detect APs, AP 300 dwells on each searched/scanned channel for a predetermined time period and "listens" for transmissions from other ones of APs 104 and 106 within transmission range, i.e., in the vicinity of, the AP.

At 410, AP 300 determines/collects AP channel statistics for each detected LTE-U AP and each detected Wi-Fi AP based on transmissions received from the detected AP on the corresponding active channel. Channel statistics for each detected AP, include: a Received Signal Strength Indicator (RSSI) indicative of an interference power received from the detected AP; a time utilization for the detected AP, which is indicative of an amount of time (i.e., transmission time) the detected AP transmits on the corresponding active channel; a channel bandwidth used by the detected AP on the corresponding active channel; and primary and secondary channels used by any detected Wi-Fi AP, if the detected Wi-Fi AP uses primary and secondary channels. The time utilization may be computed in any number of ways, including, for example, as a percentage of transmission time relative to a predetermined time period, or simply as a total transmit time.

With regard to detected Wi-Fi APs, AP 300 may determine the above-listed AP channel statistics for each detected Wi-Fi AP based on information elements (IEs) included in Wi-Fi probe response frames and/or beacon frames transmitted from the Wi-Fi AP that are received and detected by Wi-Fi receiver 303 and controller 305 of AP 300. The received/detected IEs include Wi-Fi channel identifiers, bandwidth identifiers, and primary and secondary channel identifiers.

In another embodiment in which AP 300 does not include Wi-Fi receiver 303, the AP may perform the following sequence of operations to detect each Wi-Fi AP that is transmitting and determine the associated AP channel statistics: (a) detect a Wi-Fi preamble in each of multiple received frames and associate an average RSSI and a channel bandwidth with each frame; (b) correlate frames based on their RSSIs such that frames having RSSIs within a predetermined range of each other are correlated, i.e., classified as frames that are likely sent by the same Wi-Fi AP; (c) determine a channel bandwidth of each WiFi AP based on the bandwidth of the most frequent and lengthier frames; (d) detect a most commonly used frequency channel as a Wi-Fi primary channel; (e) assign an average time utilization to each Wi-Fi Basic Service Set (BSS) that is detected in a channel (i.e., a total time utilization of all the Wi-Fi frames received on the channel divided by a total number of BSSs operating on that channel).

With regard to detected LTE-U APs, AP 300 may determine associated LTE-U AP channels statistics, including channels and corresponding channel bandwidths, based on information in LTE-U primary/secondary synchronization signals (PSS/SSS) and associated control channels that are received and decoded (i.e., detected) by LTE-U radio 301 and controller 305.

At 415, if different channel bandwidths are determined at operation 410, AP 300 normalizes all RSSIs to a smallest bandwidth among all of the different bandwidths. For example, if 20 MHz channel bandwidths are determined for Wi-Fi APs and 5 MHz channel bandwidths are determined for LTE-U APs, AP 300 normalizes RSSIs for the 20 MHz channel bandwidths to a 5 MHz bandwidth. Any now known or hereafter developed normalization technique may be used to normalize the RSSIs according to bandwidth. Normalized channel bandwidths are associated with "unit" channels, i.e., unit channels are active channels that have been normalized with respect to each other based on their respective channel bandwidths as described above.

At 420, AP 300 determines a per-channel metric for each normalized active channel (i.e., each unit channel) based on the AP channel statistics, e.g., the RSSIs and time utilizations corresponding to each active channel. The per-channel metric represents a relative suitability of the corresponding active channel for accepting transmission from an additional AP (i.e., AP 300) compared to the other active channels.

Generalized Per-Channel Metric C_i:

In a generalized form, if N APs are detected in a channel i, a generalized per-channel metric C_i for channel i is given by the equation:

$$C\_i = f(U\_1, \ldots, U\_N, R\_1, \ldots, R\_N)$$

where f denotes "a function of," U_n (where n goes from 1, . . . , N) corresponds to the utilization of AP n, and R_n is the measured RSSI of the respective AP. The arguments of the function f may be expanded to include an Average White Gaussian Noise (AWGN) measurement in the channel i.

More specifically, AP 300 may determine a first per-channel metric C1, a second per-channel metric C2, or both of the first and second per-channel metrics that each fall under the form of the generalized per-channel metric, as described below.

First Per-Channel Metric C1:

AP 300 determines the first per-channel metric C1 as follows.

First, for each unit channel, AP 300 determines a total interference power, SumIntf, as a sum of the RSSIs of all of the detected Wi-Fi/LTE-U APs operating in the channel, according to the equation:

$$\text{SumIntf} = AP\_1\_Pwr(W) + AP\_2\_Pwr(W) + \ldots,$$

where AP_i_Pwr is an RSSI of an i'th detected WiFi or LTE AP operating in the unit channel.

Second, for each unit channel, AP 300 also determines a total time utilization of the channel as a sum of the individual time utilizations for each of the detected Wi-Fi/LTE-U APs operating in the channel, according to the equation:

$$\text{Sum}U = U\_1 + U\_2 + \ldots,$$

where U_j is a utilization for the j'th detected WiFi or LTE AP in the channel.

Third, AP 300 determines the per-channel metric C1 for each channel according to the following equation:

$$C1\_i = (1 - \text{Sum}U) * \log 2(1 + 1/(\text{AWGN} + \text{SumIntf})),$$

where "i" identifies the unit channel, and AWGN is the Average White Gaussian Noise level measured/determined in the channel.

Second Per-Channel Metric C2:

AP 300 determines the second per-channel metric C2 according to the following equation:

$$C2\_i = \text{average}\{(1 - U\_j) * \log 2(1 + 1/(\text{AWGN} + \text{IntF}\_j))\},$$

where U_j and IntF_j are the associated values for time utilization and interference power (e.g., RSSI) for the j'th detected WiFi/LTE-U AP.

Note that the function "(1−U_j)*log 2(1+1/(AWGN+IntF_j))" that is averaged in the second metric C2_i represents as a separate third metric C3_i, such that C2_i=average{C3_i}. The third metric C3_i is used in an operation 480 described below.

At 425, AP 300 ranks the active channels from best to worst according to their respective per-channel metrics (C1 or C2), where the best channel corresponds to the highest per-channel metric and the worst channel corresponds to the lowest per-channel metric.

At 430, if only LTE-APs are detected, AP 300 selects a best channel among the ranked active channels on which to operate based on the active channel ranking only/solely, i.e., the channel corresponding to the highest per-channel metric is selected.

At 435, AP 300 may optionally refine/modify the channel selected at 430 so as to avoid scattering relatively narrowband (e.g., 5 MHz or 10 MHz) LTE-U active channels across two adjacent relatively wideband (e.g., 20 MHz) channels not already occupied by Wi-Fi APs, thereby leaving more spectrum (e.g., unoccupied 20 MHz channels) available for Wi-Fi APs that are subsequently activated. Thus, at 435, if a detected LTE-U AP already occupies (i.e., operates on) a portion (e.g., a 5 MHz channel) of an otherwise unoccupied 20 MHz Wi-Fi channel, AP 300 selects a highest ranked active channel that meets the following conditions: (i) is within a Wi-Fi channel (e.g., a 20 MHz channel), (ii) is already occupied by a detected LTE-U AP, and (iii) is not occupied by a Wi-Fi AP (i.e., no Wi-Fi AP is operating in the 20 MHz channel bandwidth).

Figure 5:
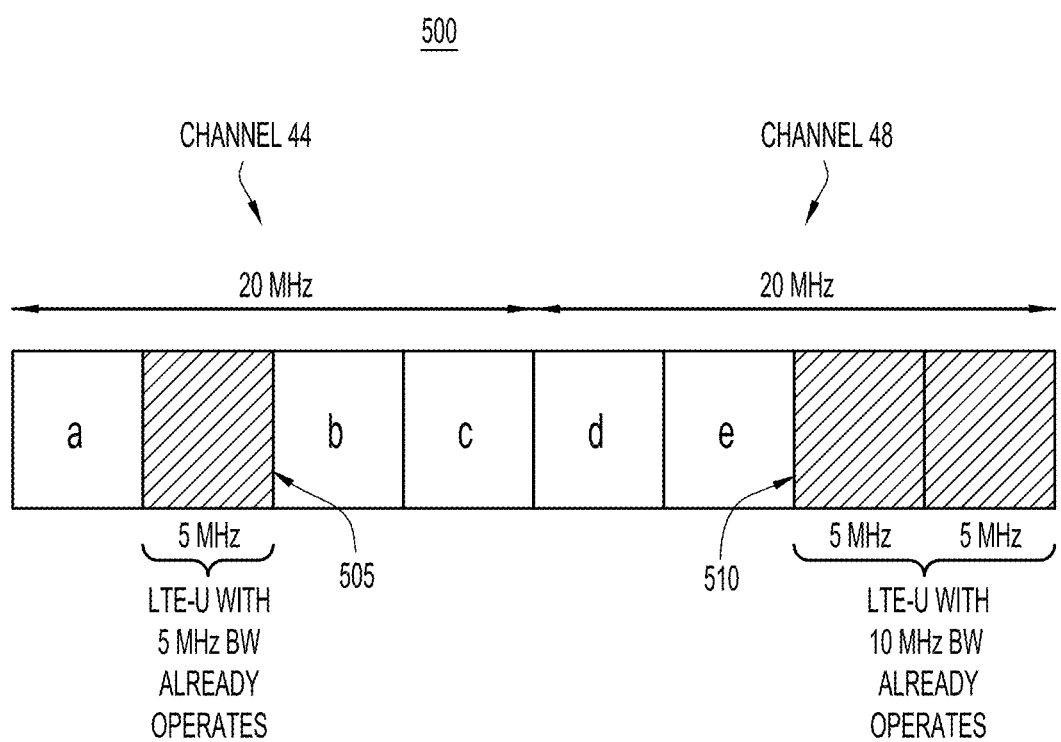
FIG. 5 is an example channel spectrum that serves as an illustration of how the LTE-U AP of FIG. 4 may operate to modify a channel selection based on LTE-U channel occupancy in adjacent Wi-Fi channels, according to an example embodiment.

With reference to FIG. 5, there is shown an example channel spectrum 500 that serves as an illustration of how AP 300 may operate at 435 to modify a selected channel. Channel spectrum 500 includes adjacent 20 MHz channels 44 and 48 from FIG. 2. Channel 44 includes a 5 MHz LTE-U channel 505 on which a detected LTE-U operates, while channel 48 includes a 10 MHz LTE-U channel 510 on which another detected LTE-U operates. No detected Wi-Fi APs operate in either channel 44 or 48, i.e., both 20 MHz channels are free of Wi-Fi transmissions. Based on the considerations mentioned above, operation 435 preferably selects as the best channel one of 5 MHz LTE-U channels a, b, c, d, or e.

Returning to FIG. 4, at 440, if any Wi-Fi APs are detected, AP 300 selects a best channel based on a consideration of the channel ranking and which of the active channels are Wi-Fi primary channels, according to operations 445-470 described below.

At 445, AP 300 determines whether the highest ranked active channel meets (i) a first condition that the highest ranked active channel is not a Wi-Fi primary channel, and (ii) a second condition that the highest ranked active channel is a Wi-Fi primary channel having an RSSI that is less than a predetermined threshold RSSI_T (e.g., −62 dBm). If either the first or second condition is met, flow proceeds to 450, where AP 300 selects the highest ranked active channel as the best channel. In an embodiment, the second condition may be dropped.

If both the first and second conditions are not met (or just the first condition is not met in the embodiment in which the second condition is dropped), flow proceeds to 455, where AP 300 evaluates whether each of the first and second conditions are met with respect to the second highest ranked active channel. If either the first or second condition is met with respect to the second highest ranked active channel, flow proceeds to 460, where AP 300 selects the second highest ranked active channel as the best channel.

If both the first and second conditions are not met with respect to the second highest ranked active channel, flow proceeds to 465, where AP 300 evaluates whether each of the first and second conditions are met with respect to the third highest ranked active channel. If either the first or second condition is met with respect to the third highest ranked active channel, flow proceeds to 470, where AP 300 selects the third highest ranked active channel as the best channel.

Summarizing operations 445-470, AP 300 searches for a highest ranked one of the active channels among at least three of the highest ranked active channels that meets either (i) the first condition that the active channel is not a Wi-Fi primary channel, or (ii) the second condition that the active channel is a Wi-Fi primary channel and has a corresponding total interference power from all of the APs operating on that active channel that is less than a predetermined interference threshold, and if the search finds a highest ranked active channel among the highest ranked active channels that meets either the first condition or the second condition, the AP selects the found highest ranked active channel as the best channel.

If both the first and second conditions are not met with respect to the third highest ranked active channel, flow proceeds to 480, where AP 300 selects the one of the three highest ranked active channel that has a highest metric C3_i taken from (i.e., a sub-function of) the corresponding metric C2_i, wherein $C3\_i=(1-U\_j)*\log(1+1/(AWGN+IntF\_j))$.

Operations 440-470 may be expanded to include consideration of secondary channels of the Wi-Fi APs, such that after avoiding the primary channel of a Wi-Fi AP, preferably the secondary channel of any WiFi AP is avoided.

As described above, method 400 selects the best channel based on interference power (RSSIs) and time utilization, generally, but also considers other factors, such as the existence of primary channels. Even further rules/factors may be used to select the best channel in certain exception cases. The further rules/factors generally aim to select secondary channels as the best channel.

If AP 300 identifies a channel that is not part of any of the detected BSSs (i.e., does not have Wi-Fi APs operating thereon), the AP should choose one of the available (unoccupied) 20 MHz channels. If multiple channels are available, the RSSIs of AP 300s in the adjacent-channels should be considered in selecting the best channel.

If AP 300 identifies a channel that is not part of any of the detected BSSs, but there is a detected LTE-U operating in the channel, depending on the detected LTE-U bandwidth, the AP may be able to operate in the same 20 MHz channel. This is possible if the detected AP has a bandwidth of 5 MHz or 10 MHz.

If all of the channels in the searched frequency band are part of an operational frequency bandwidth of multiple BSSs, then AP 300 should select a channel that is a secondary channel of existing BSS(s) in the following order:

a. If there exists a channel that is a secondary 80 MHz channel of one or more 160 MHz BSSs, but not the primary 20/40/80 MHz channel of any other BSS, then the channel should be selected for operation of AP 300;

b. If there exists a channel that is secondary 40 MHz channel of one or more 80 MHz BSSs, but not the primary 20/40 MHz channel of any other BSS, then the channel should be selected for operation of AP 300;

c. If there exists a channel that is secondary 20 MHz channel of one or more 40 MHz BSSs, but not the primary 20 MHz channel of any other BSS, then the channel should be selected for operation of AP 300;

d. If each of the channels in the searched frequency band is a primary channel of one or more operating BSSs, then AP 300 should pick a channel that is a 20 MHz primary channel of a minimum number of WiFi APs and/or the RSSI of those WiFi APs is lowest among all of them; and e. In the case of co-located WiFi and LTE-U APs, and due to the LTE Out-of-Band (OOB) emission, LTE-U channels with center frequencies that are at least 80 MHz far apart are chosen (e.g. the center frequency of the WiFi AP 20/40 MHz operation is 80 MHz apart from center frequency at which AP 300 operates).

Presented herein is a technique by which an LTE-U AP selects a channel on which to operate. The technique takes into account the presence of other APs operating within range of the LTE-U AP, including Wi-Fi APs as well as other LTE-U APs. The technique selects the channels that optimize interference/time utilization metrics, as well as exclusions that arise from the nature of Wi-Fi wideband operation so as to steer away from using Wi-Fi Primary channels, and secondary 20 MHz channels, whenever possible. In an embodiment, the LTE-U AP scans each channel for other operating WiFi/LTE-U APs and detects and infers Wi-Fi channel bandwidths and primary channels. The LTE-U AP select a best channel on which to operate based on a combined interference and time utilization metric from all of the other WiFi/LTE-U APs. Additional rules affect the outcome such as a) avoiding WiFi primary channels, and b) biasing the selection in favor of channels occupied by other LTE-U APs vs. Wi-Fi APs.

In summary, in one form, a method is provided, comprising: at a first protocol access point (AP) configured to operate wirelessly according to a first wireless protocol on any of multiple radio frequency (RF) channels in a frequency band associated with the first wireless protocol: detecting on active ones of the multiple channels first wireless protocol APs operating according to the first wireless protocol and second wireless protocol APs operating according to a second wireless protocol; determining AP channel statistics related to the detected APs, including a respective received signal strength indication (RSSI) for each detected AP and a respective time utilization indicative of a transmission time of each detected AP operating on the corresponding active channel; for each active channel, determining a per-channel metric based on the RSSIs and time utilizations for the detected APs operating on that active channel; ranking the active channels according to the corresponding per-channel metrics; and selecting a best channel on which to transmit in the frequency band from among the ranked active channels based on the ranking of the active channels.

In another form, an apparatus is provided, comprising: a radio subsystem to operate wirelessly according to a first wireless protocol on any of multiple radio frequency (RF) channels in a frequency band associated with the first wireless protocol, and to receive wireless transmissions formatted according to a second wireless protocol; and a processor coupled to the radio subsystem, to: detect on active ones of the multiple channels first wireless protocol APs operating according to the first wireless protocol and second wireless protocol APs operating according to the second wireless protocol; determine AP channel statistics related to the detected APs, including a respective received signal strength indication (RSSI) for each detected AP and a respective time utilization indicative of a transmission time of each detected AP operating on the corresponding active channel; for each active channel, determine a per-channel metric based on the RSSIs and time utilizations for the detected APs operating on that active channel; rank the active channels according to the corresponding per-channel metrics; and select a best channel on which to transmit in the frequency band from among the ranked active channels based on the ranking of the active channels.

In yet another form, a computer readable storage media is provided. The media is encoded with instructions that, when executed by a processor of an access point (AP) configured to operate wirelessly according to a first wireless protocol on any of multiple radio frequency (RF) channels in a frequency band associated with the first wireless protocol, cause the processor to: detect on active ones of the multiple channels first wireless protocol APs operating according to the first wireless protocol and second wireless protocol APs operating according to a second wireless protocol; determine AP channel statistics related to the detected APs, including a respective received signal strength indication (RSSI) for each detected AP and a respective time utilization indicative of a transmission time of each detected AP operating on the corresponding active channel; for each active channel, determine a per-channel metric based on the RSSIs and time utilizations for the detected APs operating on that active channel; rank the active channels according to the corresponding per-channel metrics; and select a best channel on which to transmit in the frequency band from among the ranked active channels based on the ranking of the active channels.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a first protocol access point (AP) configured to operate wirelessly according to a first wireless protocol on any of multiple radio frequency (RF) channels in a frequency band associated with the first wireless protocol:
detecting on active ones of the multiple channels first wireless protocol APs operating according to the first wireless protocol and second wireless protocol APs operating according to a second wireless protocol;
determining AP channel statistics related to the detected APs, including a respective received signal strength indication (RSSI) for each detected AP and a respective time utilization indicative of a transmission time of each detected AP operating on the corresponding active channel;
for each active channel, determining a per-channel metric $C\_i$ based on the RSSIs and time utilizations for the detected APs operating on that active channel according to the equation $C\_i = f(U\_1, \ldots, U\_N, R\_1, \ldots, R\_N)$, where:
i designates an i'th active channel in which N APs are detected;
f denotes "a function of";
$U\_n$ (n goes from $1, \ldots, N$) corresponds to the time utilization of detected AP n; and
$R\_n$ is the RSSI of the respective detected AP;
ranking the active channels according to the corresponding per-channel metrics; and
selecting a best channel on which to transmit in the frequency band from among the ranked active channels based on the ranking of the active channels.

2. The method of claim 1, wherein:
the second wireless protocol permits a concurrent use of a primary channel and an associated secondary channel by a given second wireless protocol AP operating in a wideband mode;
the determining detected AP channel statistics further includes determining for each detected second wireless protocol AP which of the active channels on which the detected second wireless protocol AP is operating is a primary channel, if any; and
the selecting includes selecting the best channel based on the ranking of the active channels and which ones of the active channels are primary channels.

3. The method of claim 2, wherein:
the first wireless protocol is a Long-Term Evolution-Unlicensed (LTE-U) protocol and each first wireless protocol AP is an LTE-U AP that operates according to the LTE-U protocol in an unlicensed frequency band associated with the LTE-U protocol; and
the second wireless protocol is a Wi-Fi protocol and each second wireless protocol AP is a Wi-Fi AP that operates in accordance with the Wi-Fi protocol.

4. The method of claim 2, wherein the selecting further includes:

searching for a highest ranked one of the active channels among at least three of the highest ranked active channels that is not a first wireless protocol primary channel; and if the searching finds a highest ranked active channel among the highest ranked active channels that is not a first wireless protocol primary channel, selecting the found highest ranked active channel as the best channel.

5. The method of claim 4, wherein the selecting further includes:

if the searching does not find a highest ranked active channel among the highest ranked active channels that is not a first wireless protocol primary channel, selecting the highest ranked active channel as the best channel.

6. The method of claim 2, wherein the selecting further includes:

searching for a highest ranked one of the active channels among at least three of the highest ranked active channels that meets either (i) a first condition that the active channel is not a first wireless protocol primary channel, or (ii) a second condition that the active channel is a first wireless protocol primary channel and has a corresponding total interference power representing a sum of the RSSIs of all of the APs operating on the active channel that is less than a predetermined interference threshold; and if the searching finds a highest ranked active channel among the highest ranked active channels that meets either the first condition or the second condition, selecting the found highest ranked active channel as the best channel.

7. The method of claim 6, wherein the selecting further includes:

if the searching does not find a highest ranked active channel among the highest ranked active channels that meets either the first condition or the second condition, determining a second per-channel metric for each of the at least three of the highest ranked active channels based on RSSIs and time utilizations for each of the channels; and selecting one of the at least three of the highest ranked active channels as the best channel based on the second per-channel metric.

8. The method of claim 2, wherein the determining detected AP channel statistics further includes:

determining a channel bandwidth of each active channel being used by the corresponding AP operating on that active channel; and if the channel bandwidths include different channel bandwidths, normalizing the respective RSSIs based on a smallest channel bandwidth among the different channel bandwidths, wherein the determining the per-channel metric includes determining the per-channel metric based on the normalized RSSIs.

9. The method of claim 1, wherein the determining the per-channel metric includes, for each active channel:

determining a total RSSI of the active channel based on the individual RSSIs of all of the detected APs operating on the active channel;

determining a total time utilization of the active channel based on the individual time utilizations of all of the detected APs operating on the active channel; and determining the per-channel metric for the active channel based on the total RSSI and the total time utilization for the active channel.

10. The method of claim 9, wherein the determining the per-channel metric includes determining the per-channel metric $C\_i$ for each active channel designated as the i'th active channel, according to the equation:

$$C\_i=(1-\text{Sum}U)*\log 2(1+1/(\text{AWGN}+\text{SumIntf})),$$

where:

AWGN is an Average White Gaussian Noise level determined for the i'th active channel;

SumU is a total channel time utilization represented as a sum of the time utilizations of all of the detected APs operating in the i'th active channel; and SumIntf is a total channel interference represented as a sum of the RSSIs of all of the detected APs operating in the i'th active channel.

11. The method of claim 1, wherein the determining the per-channel metric includes, for each active channel:

calculating for each detected AP operating in the active channel a product of a first function that is based on the RSSI for that detected AP and a second function that is based on the time utilization for that detected AP; and averaging the calculated products corresponding to the detected APs in the active channel across a total number of detected APs in the active channel, to produce the per-channel metric for the active channel.

12. The method of claim 11, wherein the determining the per-channel metric includes determining the per-channel metric $C\_i$ for each active channel designated as an i'th active channel, according to the equation:

$$C\_i=\text{average}\{(1-U\_j)*\log 2(1+1/(\text{AWGN}+\text{IntF}\_j)\},$$

where:

AWGN is an Average White Gaussian Noise level determined for the i'th active channel; and $U\_j$ and $\text{IntF}\_j$ are respective values for the time utilization and the RSSI for a j'th detected WiFi/LTE-U AP operating in the i'th active channel.

13. The method of claim 1, wherein the frequency band associated with the first wireless protocol is an unlicensed frequency band associated with the first wireless protocol.

14. An apparatus comprising:

a radio subsystem to operate wirelessly according to a first wireless protocol on any of multiple radio frequency (RF) channels in a frequency band associated with the first wireless protocol, and to receive wireless transmissions formatted according to a second wireless protocol; and a processor coupled to the radio subsystem, to:

detect on active ones of the multiple channels first wireless protocol APs operating according to the first wireless protocol and second wireless protocol APs operating according to the second wireless protocol;

determine AP channel statistics related to the detected APs, including a respective received signal strength indication (RSSI) for each detected AP and a respective time utilization indicative of a transmission time of each detected AP operating on the corresponding active channel;

for each active channel, determine a per-channel metric $C\_i$ based on the RSSIs and time utilizations for the detected APs operating on that active channel according to the equation $C\_i=f(U\_1, \ldots, U\_N, R\_1, \ldots, R\_N)$, where:

i designates an i'th active channel in which N APs are detected;

f denotes "a function of",

U_n (n goes from 1, ..., N) corresponds to the time utilization of detected AP n; and R_n is the RSSI of the respective detected AP;

rank the active channels according to the corresponding per-channel metrics; and select a best channel on which to transmit in the frequency band from among the ranked active channels based on the ranking of the active channels.

15. The apparatus of claim 14, wherein:

the second wireless protocol permits a concurrent use of a primary channel and an associated secondary channel by a given second wireless protocol AP operating in a wideband mode;

the processor is configured to determine by determining for each detected second wireless protocol AP which of the active channels on which the detected second wireless protocol AP is operating is a primary channel, if any; and the processor is configured to select by selecting the best channel based on the ranking of the active channels and which ones of the active channels are primary channels.

16. The apparatus of claim 15, wherein:

the first wireless protocol is a Long-Term Evolution-Unlicensed (LTE-U) protocol and each first wireless protocol AP is an LTE-U AP that operates according to the LTE-U protocol in an unlicensed frequency band associated with the LTE-U protocol; and the second wireless protocol is a Wi-Fi protocol and each second wireless protocol AP is a Wi-Fi AP that operates in accordance with the Wi-Fi protocol.

17. The apparatus of claim 15, wherein the processor is configured to select by:

searching for a highest ranked one of the active channels among at least three of the highest ranked active channels that is not a first wireless protocol primary channel; and if the searching finds a highest ranked active channel among the highest ranked active channels that is not a first wireless protocol primary channel, selecting the found highest ranked active channel as the best channel.

18. The apparatus of claim 17, wherein the processor is further configured to select by:

if the searching does not find a highest ranked active channel among the highest ranked active channels that is not a first wireless protocol primary channel, selecting the highest ranked active channel as the best channel.

19. The apparatus of claim 15, wherein the processor is further configured to select by:

searching for a highest ranked one of the active channels among at least three of the highest ranked active channels that meets either (i) a first condition that the active channel is not a first wireless protocol primary channel, or (ii) a second condition that the active channel is a first wireless protocol primary channel and has a corresponding total interference power representing a sum of the RSSIs of all of the APs operating on the active channel that is less than a predetermined interference threshold; and if the searching finds a highest ranked active channel among the highest ranked active channels that meets either the first condition or the second condition, selecting the found highest ranked active channel as the best channel.

20. The apparatus of claim 19, wherein the processor is further configured to select by:

if the searching does not find a highest ranked active channel among the highest ranked active channels that meets either the first condition or the second condition, determining a second per-channel metric for each of the at least three of the highest ranked active channels based on RSSIs and time utilizations for each of the channels; and selecting one of the at least three of the highest ranked active channels as the best channel based on the second per-channel metric.

21. The apparatus of claim 15, wherein the processor is further configured to determine detected AP channel statistics by:

determining a channel bandwidth of each active channel being used by the corresponding AP operating on that active channel; and if the channel bandwidths include different channel bandwidths, normalizing the respective RSSIs based on a smallest channel bandwidth among the different channel bandwidths, wherein the determining the per-channel metric includes determining the per-channel metric based on the normalized RSSIs.

22. The apparatus of claim 14, wherein the processor is configured to determine the per-channel metric by, for each active channel:

determining a total RSSI of the active channel based on the individual RSSIs of all of the detected APs operating on the active channel;

determining a total time utilization of the active channel based on the individual time utilizations of all of the detected APs operating on the active channel; and determining the per-channel metric for the active channel based on the total RSSI and the total time utilization for the active channel.

23. The apparatus of claim 14, wherein the frequency band associated with the first wireless protocol is an unlicensed frequency band associated with the first wireless protocol.

24. A non-transitory computer readable storage media encoded with instructions that, when executed by a processor of an access point (AP) configured to operate wirelessly according to a first wireless protocol on any of multiple radio frequency (RF) channels in a frequency band associated with the first wireless protocol, cause the processor to:

detect on active ones of the multiple channels first wireless protocol APs operating according to the first wireless protocol and second wireless protocol APs operating according to a second wireless protocol;

determine AP channel statistics related to the detected APs, including a respective received signal strength indication (RSSI) for each detected AP and a respective time utilization indicative of a transmission time of each detected AP operating on the corresponding active channel;

for each active channel, determine a per-channel metric C_i based on the RSSIs and time utilizations for the detected APs operating on that active channel according to the equation C_i=f(U_1, ..., U_N, R_1, ..., R_N), where:

i designates an I'th active channel in which N APs are detected;

f denotes "a function of";

U_n (n goes from 1, ..., N) corresponds to the time utilization of detected AP n; and R_n is the RSSI of the respective detected AP;
rank the active channels according to the corresponding per-channel metrics; and
select a best channel on which to transmit in the frequency band from among the ranked active channels based on the ranking of the active channels.

25. The non-transitory computer readable storage media of claim 24, wherein:
the second wireless protocol permits a concurrent use of a primary channel and an associated secondary channel by a given second wireless protocol AP operating in a wideband mode;
the instructions include instructions to cause the processor to determine for each detected second wireless protocol AP which of the active channels on which the detected second wireless protocol AP is operating is a primary channel, if any; and
the instructions include instructions to cause the processor to select the best channel based on the ranking of the active channels and which ones of the active channels are primary channels.

26. The non-transitory computer readable storage media of claim 25, wherein:
the first wireless protocol is a Long-Term Evolution-Unlicensed (LTE-U) protocol and each first wireless protocol AP is an LTE-U AP that operates according to the LTE-U protocol in an unlicensed frequency band associated with the LTE-U protocol; and
the second wireless protocol is a Wi-Fi protocol and each second wireless protocol AP is a Wi-Fi AP that operates in accordance with the Wi-Fi protocol.

27. The non-transitory computer readable storage media of claim 25, further including instructions to cause the processor to:
search for a highest ranked one of the active channels among at least three of the highest ranked active channels that is not a first wireless protocol primary channel; and
if the search finds a highest ranked active channel among the highest ranked active channels that is not a first wireless protocol primary channel, select the found highest ranked active channel as the best channel.

28. The non-transitory computer readable storage media of claim 25, further including instructions to cause the processor to:
search for a highest ranked one of the active channels among at least three of the highest ranked active channels that meets either
(i) a first condition that the active channel is not a first wireless protocol primary channel, or
(ii) a second condition that the active channel is a first wireless protocol primary channel and has a corresponding total interference power representing a sum of the RSSIs of all of the APs operating on the active channel that is less than a predetermined interference threshold; and
if the search finds a highest ranked active channel among the highest ranked active channels that meets either the first condition or the second condition, select the found highest ranked active channel as the best channel.

29. The non-transitory computer readable storage media of claim 24, further including instructions to cause the processor to determine the per-channel metric by, for each active channel:
determining a total RSSI of the active channel based on the individual RSSIs of all of the detected APs operating on the active channel;
determining a total time utilization of the active channel based on the individual time utilizations of all of the detected APs operating on the active channel; and
determining the per-channel metric for the active channel based on the total RSSI and the total time utilization for the active channel.

* * * * *